(12) United States Patent
Lunden

(10) Patent No.: US 6,297,648 B1
(45) Date of Patent: Oct. 2, 2001

(54) OSCILLATING CAVITY PAINT METER

(75) Inventor: C. David Lunden, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/295,563

(22) Filed: Apr. 20, 1999

Related U.S. Application Data

(60) Division of application No. 08/870,150, filed on Jun. 5, 1997, now abandoned, which is a continuation-in-part of application No. 08/708,101, filed on Aug. 16, 1996, now abandoned.

(51) Int. Cl.[7] ................................................. G01R 27/04
(52) U.S. Cl. ............................................................ 324/635
(58) Field of Search .................................. 324/642, 537, 324/719, 724, 632, 633, 639, 636, 635, 641, 637; 118/718, 723 MA, 729, 730; 427/570, 571, 572; 333/22 F, 248

(56) References Cited

U.S. PATENT DOCUMENTS

| 4,443,106 | 4/1984 | Yasuda et al. . | |
|---|---|---|---|
| 4,943,778 | * 7/1990 | Osaki | 324/636 |
| 5,093,626 | 3/1992 | Baer et al. . | |
| 5,140,274 | 8/1992 | Wertz et al. . | |
| 5,175,516 | * 12/1992 | Walsh et el. | 333/22 F |

* cited by examiner

*Primary Examiner*—Safet Metjahic
*Assistant Examiner*—Etienne LeRoux
(74) *Attorney, Agent, or Firm*—Conrad O. Gardner

(57) ABSTRACT

A measuring instrument and method for measuring paint and coating thickness on poorly conductive graphite substrates. The instrument uses a microwave amplifier, a measurement cavity, and an optional reference cavity with supporting electronics to measure the apparent changes in the length of the measurement cavity due to the changes in the paint and coating thickness. The measurement cavity resonates when the measurement cavity is set upon the test surface. The oscillating signal is sent through a) directly to a microwave frequency counter, or b) a reference cavity tuned to give the desired slope detection response to cover the paint and coating thickness range allowed. The filtered response of the reference cavity is converted to a dc level signal proportional to paint thickness. It is presumed that the expert user will have access to a PC allowing instant conversion—via a stepped calibration plate—to paint thickness in mils from electrical data.

7 Claims, 3 Drawing Sheets

OSCILLATING CAVITY PAINT METER

RELATED APPLICATIONS

This application is divisional application of continuation-in-part application Ser. No. 08/870,150, filed Jun. 5, 1997, now abandoned, which is a continuation-in-part of Ser. No. 08/708,101, filed Aug. 16, 1996, now abandoned.

BACKGROUND OF THE INVENTION

1. Field of the Invention

The present invention relates to the non-destructive thickness measurements of the paint and coating thickness for graphite/epoxy composites, and other poorly conductive substrates. In particular, the invention may be used to measure the dry paint film thickness applied by conventional or electrostatic spraying of primer, paint, or other coatings on a poorly conductive surface.

2. Statement of the Problem

In the spray application of many paints, it is difficult to maintain a uniform thickness application of the primer or paint. The difference in paint film thickness results in appearance changes in which the substrate shows. As a result of the substrate showing through, users tend to apply primer and paint thicker than specified on graphite/epoxy composites. Present methods for measuring dry film thickness on metal substrates do not work on graphite/epoxy composites. There is no good and accurate non-destructive method or device for quickly and accurately measuring the primer, paint and coating thickness on graphite/epoxy composites. This is because the eddy-current thickness (skin depth) in graphite is greater than most paint thickness (3–6 mils). Over metal substrates the eddy-current paint meters (f~5 MH$_z$) have skin depths much less than this paint thickness. By raising operating frequency to ~$10^9$ Hz (X-band) we solve the skin depth problem, but encounter another. It is difficult to create the neat circular eddies—with high Q and insensitive to edge effects—that one readily obtains at low frequencies with a simple eddy "pancake" coil. To solve this second problem, we employ a choke flange (normally used to couple waveguides end to end) to create a standard (well-defined) current distribution on the Surface Under Test (SUT) i.e., the painted graphite. Incidentally, this non-circulating (non-eddy) current distribution responds mainly to the TOP layer of unidirectional graphite usually used in aerospace structures.

There is a need for a dry film thickness measurement instrument and method for graphite/epoxy composites which does not destroy the paint and coating and accurately measures the dry film thickness on graphite/epoxy composites surfaces.

3. Object of the Invention

One of the objects of the present invention is to provide a measuring instrument which is able to measure thickness of the primer, paint, and coating on metal and graphite/epoxy composites without destroying the dry film layer. To this end, the present invention uses a measurement cavity that oscillates at a fixed microwave frequency dependent on the apparent length of the cavity.

However, it is difficult for users to correlate a given frequency change with a thickness measurement. Therefore, another object of the invention is to provide a measuring instrument which converts the frequency changes due to the apparent length change of the cavity into a thickness measurement.

SUMMARY OF THE INVENTION

An electrical instrument and method for measuring the dry paint and coating thickness on conductive and poorly conductive substrates non-destructively which instrument contains the following components:

a. a measurement cavity (5 walls) that oscillates at a frequency dependent on the apparent length of the cavity when the sixth wall, the SUT, formed by the conductive substrates, is brought to position;

b. a reference cavity connected to the above measurement cavity to convert the frequency changes to dc level changes or;

c. a microwave counter to read cavity oscillator frequency directly.

BRIEF DESCRIPTION OF THE DRAWING(S)

FIGS. 2A–E are block diagrams of the electronics showing the sensor oscillator circuit and its electrical functioning when paint thickness is varied.

Figure 3A:
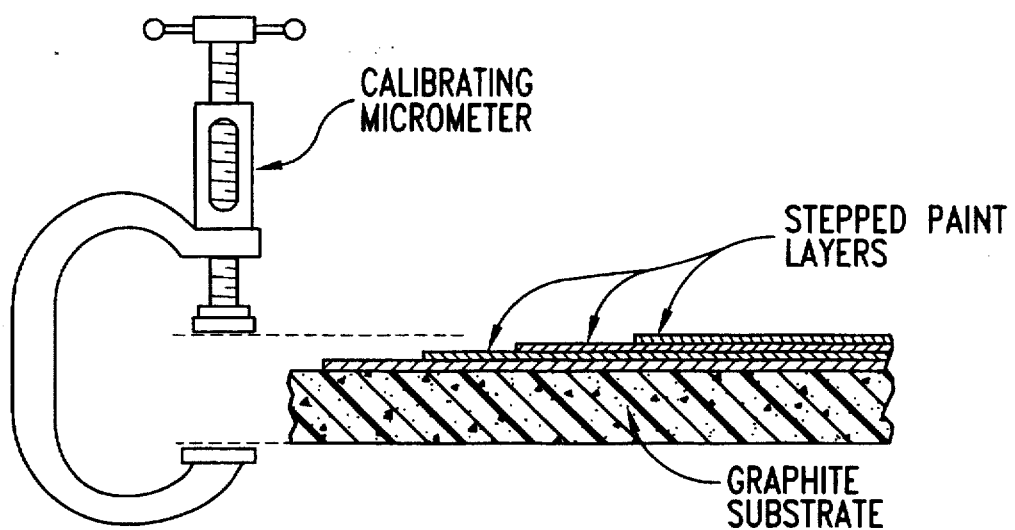

FIG. 3A shows a stepped thickness (masked and repainted repeatedly) sample large enough to accept the subject sensor, small enough to accept calibrating micrometer jaws.

Figure 3B:
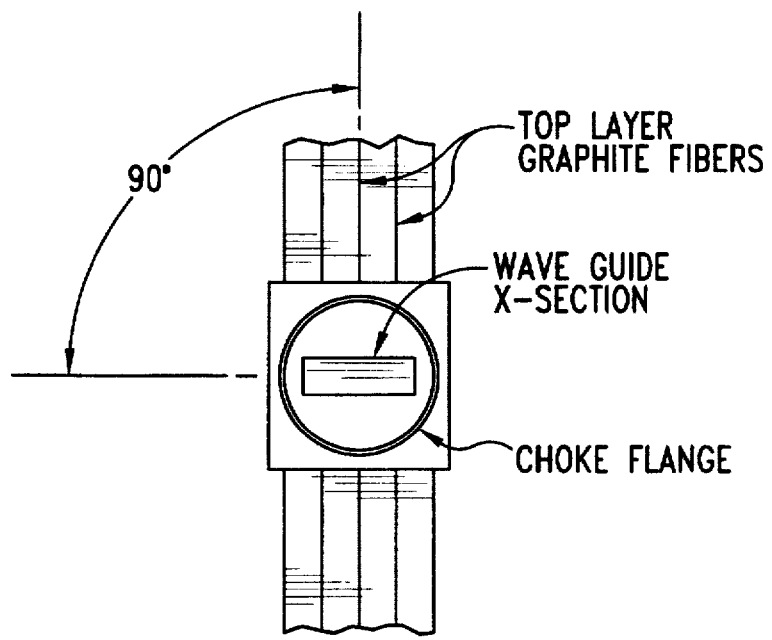

FIG. 3B shows proper 90 degree orientation of the choke flange with respect to the top layer of the underlying graphite fibers.

DESCRIPTION OF THE PREFERRED EMBODIMENT(S)

The principal advantage of the present invention is to provide an instrument that measures the thickness of dry primer, paint, or coating thickness applied on a graphite/epoxy composite substrates without destroying or damaging the primer, paint or coating. The instrument has the advantage of being independent of the optical reflectivity, color, and scattering properties of the coating. The instrument measures the thickness of a dry film applied to metal, graphite/epoxy composite or other conductive substrates to a measurement uncertainty of 0.4 mils or better. The instrument cain be used to accurately measure the dry film thickness of different types of paints, such as glossy, flat and metal-flake containing paints.

Figure 1A:
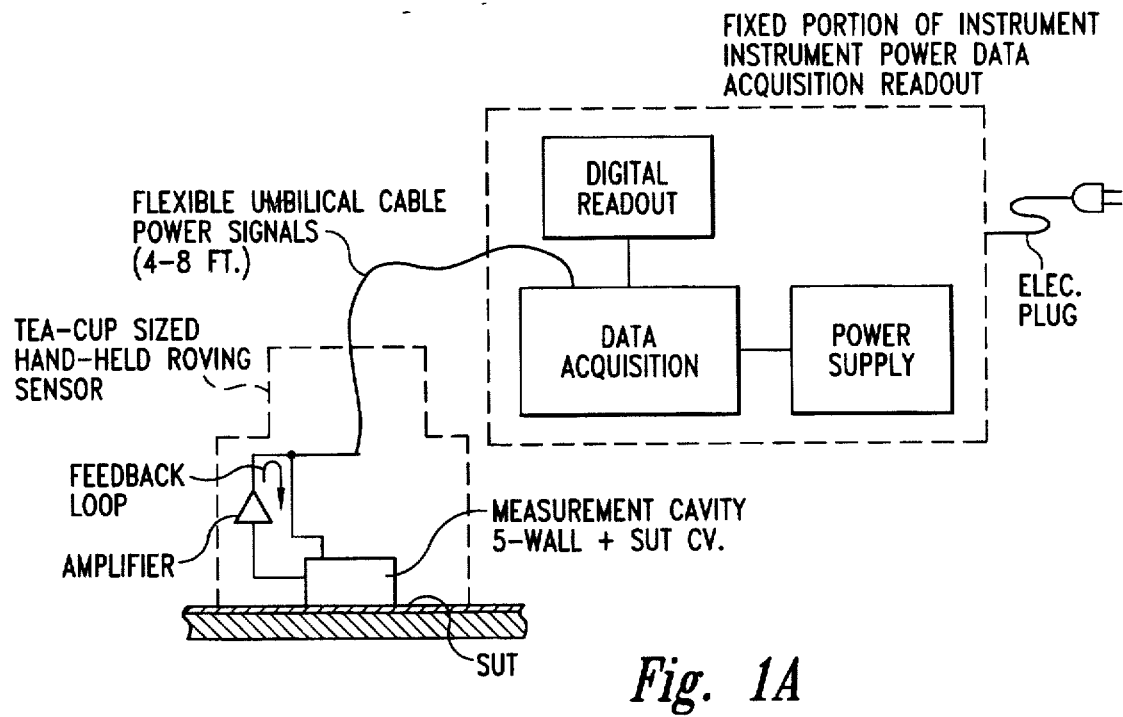
FIG. 1A is a block diagram of the instrument of the invention showing the sensor assembly consisting of the measurement and reference cavities and amplifier, the data acquisition circuit, and power supply.

As shown in FIG. 1A, an instrument embodying the present invention comprises an enclosure housing a measurement cavity CV1, and microwave amplifier AMP1. A small film covers the base of the measurement cavity CV1 to prevent marking of the coated substrate. The amplifier AMP1 and measurement cavity CV1 loop oscillates when the sixth wall of the measurement cavity, the Surface Under Test (SUT) completes the circuit. The frequency of oscillation of the amplifier AMP1 and measurement cavity CV1 is given as a function of the cavity length:

$$freq = \frac{v}{2l},$$

where freq is the frequency of oscillation and l is the cavity length. V is the velocity of propagation given by the equation:

$$v = c/\epsilon,$$

where c is the speed of electromagnetic wave in free space and $\epsilon$ is the relative waveguide phase velocity. The oscillating frequency of the measurement cavity CV1 decreases as the dry film thickness increases.

Figure 1B:
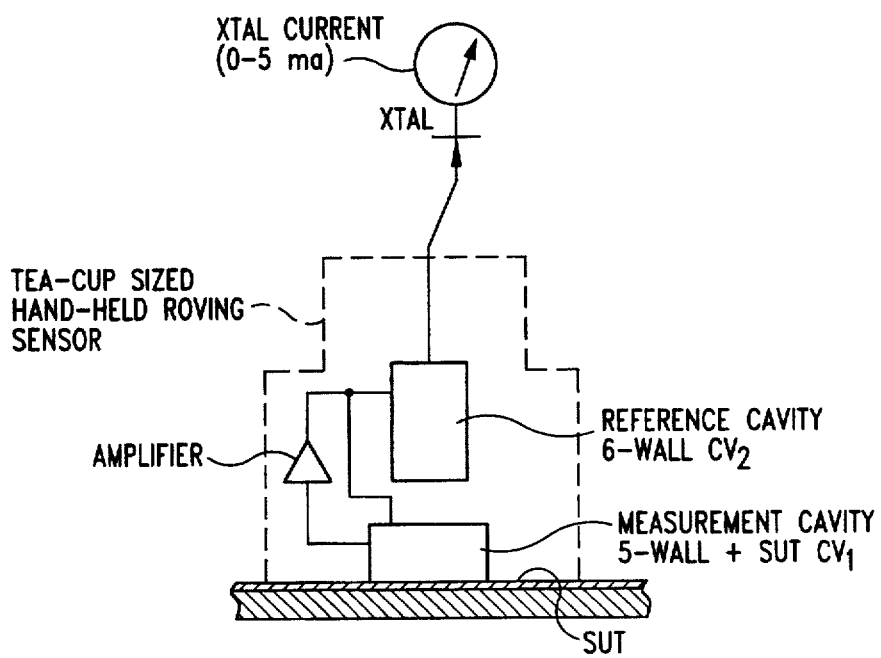
FIG. 1B shows a second reference cavity and crystal detector used to provide an analog output for lightweight portable use.

In FIG. 1B a second reference cavity, CV2, and crystal (xtal) detector is used to provide an analog output for lightweight portable use. The second cavity functions as a reference, set to peak response when the sensor cavity CV1 is on a bare SUT. Increasing paint thickness lowers oscillator frequency, which "slides down" the wing of CV2 response: We have a slope detection.

Figure 2A:
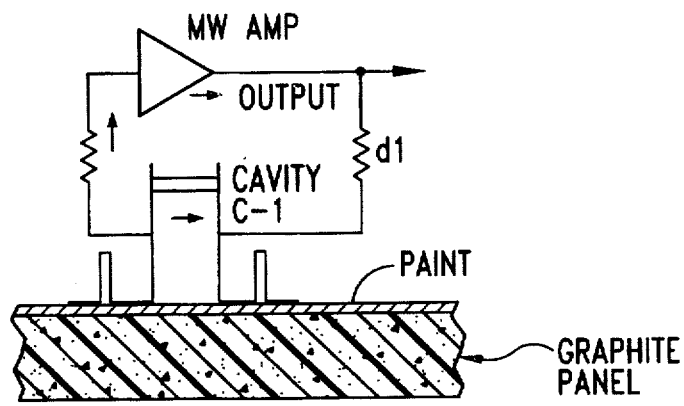
Figure 2B:
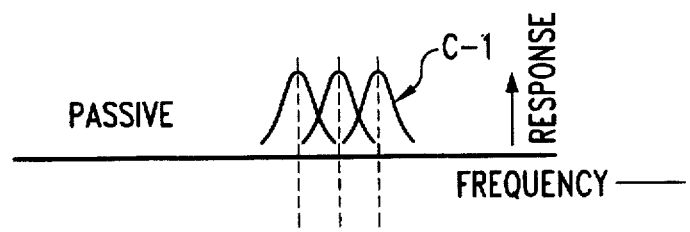
Figure 2C:
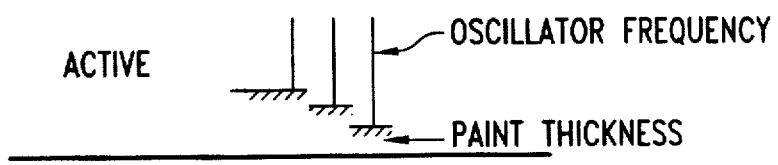
Figure 2D:
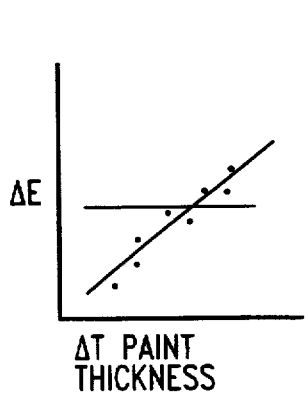
Figure 2E:
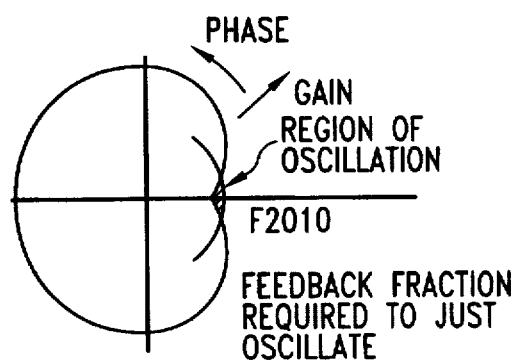

In FIG. 2E the amplifier/attenuator/cavity loop gain is set to 4-db to just oscillate when the sensor cavity flange is set on the SUT. Oscillator or signal ($f_1$) is tapped off to a) a microwave counter (digital) and/or
b) a 2nd fixed reference cavity (CV2). As paint thickness increases (and cavity length increases) $f_1$ decreases, and the output of cavity CV2 drops.

FIG. 2B shows CV1 sweep-frequency response (voltage), requiring bulky auxiliary microwave equipment.

FIG. 2C shows corresponding oscillator frequency $f_1$ changes with stepped paint thickness. The dotted vertical lines connect FIG. 2B and FIG. 2C. The system oscillates, at a given paint thickness, exactly where its passive response peaks. The active (oscillator) embodiment functions as a "peak-response finder".

FIG. 2D shows paint thickness vs. oscillator frequency change. Typical slope is 5–7 mHz/mil of paint thickness.

FIG. 2E, a phase-gain graph, shows oscillator feedback fraction (adjusted by the loop attenuators) to cause the loop to just oscillate without jumping to an extraneous frequency as when loop gain is set too high.

Preferred readout is the microwave digital counter, using a lookup calibration table and laptop computer.

Alternatively, the analog slope—detection circuit can be used—with less precision where truly portable battery operation is needed or where explosive atmosphere precludes electric power.

Operation (FIG. 3)

Instrument is allowed to warm up (cavity temp is critical and one must be careful about hand warming) and calibrated on a small 4"×10" flat graphite sample step-painted such as (FIG. 3A), and accurately "miked" with a micrometer:

| Zone 1 | bare |
|---|---|
| Zone 2 | primer |
| Zone 3 | primer + paint 2 mil |
| Zone 4 | primer + paint 4 mil |
| Zone 5 | primer + paint 8 mil |

Sensor flange must be set with currents parallel to top layer of unidirectional graphite (FIG. 3B). This is done by rotating the cavity/flange unit for highest frequency (the paint renders the graphite invisible to the eye).

The invention provides a means for determining the orientation of the top layer of conductive strands, for example, in unidirectional graphite/epoxy tape which may be hidden from view by the coating.

It should be understood that the foregoing description is directed to the preferred embodiment of the disclosed method and instrument and that various changes and modifications, for example, the use of microprocessor or computer or changing the enclosures, may be made without departing from the spirit and scope of the present invention by the appended claims.

What is claimed is:

1. A method for measuring paint thickness on a conductive substrate comprising:

a five-wall cavity oscillator coupled via a roving choke flange to a paint coating; the cavity resonance shift due to lengthening provided by the paint coating with substantial insensitivity to paint coating permittivitiy E.

2. A method for measuring paint coating thickness on graphite-epoxy composites comprising the steps of:

utilizing an operating frequency at X-band; and, utilizing a choke flange to create a non-circulating current distribution on the surface under test which responds to the top layer of unidirectional graphite.

3. A method for determining the thickness of a coating on metal and graphite-epoxy composites without destroying the film, the dry film layer comprising the steps of:

utilizing a measurement cavity that oscillates at a fixed microwave frequency on the apparent length of the cavity; and, converting the frequency changes due to the apparent length of the cavity into a thickness measurement.

4. An electrical instrument for measuring dry paint and coating thickness on conductive and poorly conductive substrates non-destructively comprising:

a five-walled measurement cavity that oscillates at a frequency dependent on the apparent length of the cavity when the sixth wall comprising the surface under test formed by the conductive substrates is brought into position; and, a reference cavity connected to said five-walled measurement cavity for converting frequency changes to dc level changes.

5. An electrical instrument for measuring dry paint and coating thickness on conductive and poorly conductive substrates non-destructively comprising:

a five-walled measurement cavity that oscillates at a frequency dependent on the apparent length of the cavity when the sixth wall comprising the surface under test formed by the conductive substrate is brought into position; and, a microwave counter for reading cavity oscillator frequency directly.

6. In combination in a system for measuring the thickness of a dry film applied to a graphite/epoxy composite having graphite fibers:

a multiwalled cavity coupled to a choke flange; and, 90-degree orientation of said coke flange with respect to the top layer of the underlying graphite fibers.

7. In combination:

a multiwalled cavity;

a sensor flange coupled to said multiwalled cavity; and, said sensor flange set with currents parallel to the top layer of unidirectional graphite fibers.

* * * * *